United States Patent

Saito et al.

[11] Patent Number: 6,136,235
[45] Date of Patent: *Oct. 24, 2000

[54] METHOD AND APPARATUS FOR PREDICTING DEFORMATION AMOUNT IN INJECTION-MOLDED ARTICLE AND INJECTION MOLDING SYSTEM

[75] Inventors: Maki Saito, Kawasaki; Hisakazu Morinaga, Yamato; Hiroaki Yamagata, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/108,701

[22] Filed: Jul. 1, 1998

Related U.S. Application Data

[62] Division of application No. 08/749,833, Nov. 15, 1996, Pat. No. 5,811,133.

[30] Foreign Application Priority Data

Dec. 27, 1993 [JP] Japan ................................... 5-330757

[51] Int. Cl.$^7$ .............................. B29C 45/76; G06G 7/58
[52] U.S. Cl. .................................... 264/40.1; 264/328.12; 395/500.3; 425/555; 700/200
[58] Field of Search ............................ 264/40.1, 328.12, 264/40.4, 40.5, 40.7, 328.1; 425/145, 149, 555; 364/475.02, 475.03, 475.05, 475.09, 578; 395/500.3, 500.27, 500.28; 700/200, 204

[56] References Cited

U.S. PATENT DOCUMENTS

| | | |
|---|---|---|
| 4,833,910 | 5/1989 | Kenmochi . |
| 4,989,166 | 1/1991 | Akasaka et al. ..................... 364/578 |
| 5,097,431 | 3/1992 | Harada et al. ....................... 364/578 |
| 5,097,432 | 3/1992 | Harada et al. ....................... 364/578 |
| 5,227,979 | 7/1993 | Fukuhira et al. .................... 364/578 |
| 5,275,768 | 1/1994 | Inaba et al. . |
| 5,402,366 | 3/1995 | Kihara et al. ....................... 364/578 |
| 5,423,673 | 6/1995 | Sawae et al. ..................... 264/328.12 |
| 5,427,516 | 6/1995 | Bader et al. . |
| 5,552,995 | 9/1996 | Sebastian ........................ 364/468.03 |
| 5,578,256 | 11/1996 | Austin ................................ 264/40.1 |

*Primary Examiner*—Jill L. Heitbrink
*Attorney, Agent, or Firm*—Morgan & Finnegan, LLP

[57] ABSTRACT

A simulation system predicts a behavior of a molten resin in a mold in filling, packing, and cooling processes by using a fundamental equation formulated by the finite element method, and shrinkage factors in a direction of thickness and planar directions based on anisotropy of a volume shrinkage factor obtained during prediction of the filling, packing, and cooling processes, so that a warp deformation in an injection-molded article can be predicted at a higher precision. In this simulation system, the warp deformation is predicted by calculating the shrinkage factors in accordance with:

$$\epsilon Z = A + B \cdot eV \quad (1)$$

$$\epsilon P = (eV - \epsilon Z)/2 \quad (2)$$

wherein $\epsilon Z$ is a shrinkage factor in the direction of thickness, $\epsilon P$ is a shrinkage factor in the planar directions, $eV$ is a volume shrinkage factor, and A and B are shrinkage coefficients.

4 Claims, 6 Drawing Sheets

UNIT : mm

FIG. 3

| MEASUREMENT POINT | SHRINKAGE FACTOR IN DIRECTION OF THICKNESS | SHRINKAGE FACTOR IN FLOW DIRECTION | SHRINKAGE FACTOR IN ORTHOGONAL DIRECTION |
|---|---|---|---|
| H1 | 1.50<br>3.64<br>1.51 | 0.27<br>0.24<br>1.51 | 0.56<br>0.64<br>1.51 |
| H2 | 1.33<br>3.51<br>1.47 | 0.12<br>0.24<br>1.47 | 0.49<br>0.66<br>1.47 |
| H3 | 1.27<br>3.64<br>1.51 | 0.13<br>0.24<br>1.51 | 0.56<br>0.64<br>1.51 |
| H4 | 1.07<br>3.51<br>1.47 | 0.20<br>0.24<br>1.47 | 0.66<br>0.66<br>1.47 |

UPPER POSITION : ACTUALLY MEASURED VALUE

MIDDLE POSITION : ANALYTIC VALUE (ANISOTROPIC SHRINKAGE)

LOWER POSITION : ANALYTIC VALUE (ISOTROPIC SHRINKAGE)

METHOD AND APPARATUS FOR PREDICTING DEFORMATION AMOUNT IN INJECTION-MOLDED ARTICLE AND INJECTION MOLDING SYSTEM

This is a divisional of application Ser. No. 08/749,833 filed Nov. 15, 1996 now U.S. Pat. No. 5,811,133.

BACKGROUND OF THE INVENTION

The present invention relates to a method and apparatus for predicting a deformation amount in plastic injection molding and, more particularly, to a method and apparatus for predicting a deformation amount which are suitably applied to a simulation program that analyzes the behavior of a molten resin from injection into a mold to setting, and predicts a limit where a "warp" occurs in a plastic molded article, especially a thin molded article, which is obtained by removal after mold opening.

Conventionally, a simulation program is known which is used for predicting the behavior of a resin during resin injection molding and a warp deformation in a plastic molded article. According to this program, when calculation of the resin behavior and prediction of a warp are to be performed, the model shape of a plastic molded article is created. The model shape is divided into meshes to enable calculation of the finite element method. Various molding conditions are input as boundary conditions, and various material data of the resin are input. When a plastic resin in a molten state is to be filled into the cavity of a mold without a gap, the equation of motion, the equation of energy conservation, and the equation of continuity are formulated by the finite element method, thereby predicting the behavior of the molten resin.

In the packing and cooling processes of the mold after the resin is filled, in order to further consider the compression properties of the resin, the volume shrinkage factor is finally calculated based on an equation of P (Pressure)–V (Volume ratio)–T (Temperature), thereby calculating uniform shrinkage factors in the x, y, and z directions, i.e., a direction of thickness and planar directions.

The distribution of the shrinkage factors within the surface finally obtained in this manner is recognized and input as an initial strain in advance. The warp deformation in the plastic molded article is predicted from a calculation result obtained by an injection molding predicting method formulated in accordance with the finite element method.

One of the greatest features of a plastic molded article is the anisotropy of the shrinkage factor. Especially, it is known that in a thin molded article, the shrinking behaviors largely differ between the direction of thickness and the planar directions.

Furthermore, it is conventionally known by the skilled in the art from experiences that the shrinking behaviors greatly differ between in the direction of the resin flow in the planar directions and in a direction perpendicular to this direction of the resin flow.

In the conventional simulation program, however, the behavior of the anisotropy of the shrinkage factor is not considered. More specifically, according to the conventional simulation program, a volume shrinkage factor is simply equally divided into x, y, and z directions, and the divided factor components are distributed to the direction of thickness and the planar directions, thereby obtaining a shrinkage factor. Then, a warp deformation in an injection-molded article is predicted by utilizing the shrinkage factor components in the planar directions as the initial strains. As a result, higher-precision warp prediction cannot be performed.

SUMMARY OF THE INVENTION

A method and apparatus for predicting a deformation amount in an injection-molded article and an injection molding system according to the present invention have been made in view of the above problems, and have as their object to enable higher-precision prediction of a warp deformation in an injection-molded article. It is especially an object of the present invention to achieve higher-precision warp prediction in a thin molded article in which the anisotropic behavior of a plastic resin is typical.

In order to solve the above problems and to achieve the above object, according to the present invention, there is provided, in a simulation system which predicts a behavior of a molten resin in a molding filling, packing, and cooling processes by using a fundamental equation formulated by the finite element method, and shrinkage factors in a direction of thickness and planar directions based on anisotropy of a volume shrinkage factor obtained during prediction of the filling, packing, and cooling processes, a method of predicting a deformation amount in an injection-molded article, wherein a warp deformation is predicted by calculating the shrinkage factors in accordance with:

$$\epsilon Z = A + B \cdot eV \quad (1)$$

$$\epsilon P = (eV - \epsilon Z)/2 \quad (2)$$

wherein $\epsilon Z$ is a shrinkage factor in the direction of thickness, $\epsilon P$ is a shrinkage factor in the planar directions, $eV$ is a volume shrinkage factor, and A and B are shrinkage coefficients. Thus, in a thin molded article whose shrinkage factor has a typical anisotropy, even if the shrinking behaviors of the resin flow in the direction of thickness and of the resin flow in an orthogonal direction in the planar directions are different, a warp deformation is predicted based on the above equations, thereby enabling higher-precision warp prediction.

Preferably, in a simulation system which predicts a behavior of a fiber-containing molten resin in a mold in filling, packing, and cooling processes by using a fundamental equation formulated by the finite element method, and shrinkage factors in a direction of thickness and planar directions based on anisotropy of a volume shrinkage factor obtained during prediction of the filling, packing, and cooling processes, a warp deformation is predicted by calculating the shrinkage factors in accordance with:

$$\epsilon L = (eV - \epsilon V) \cdot \alpha L / (\alpha L + \alpha T) \quad (3)$$

$$\epsilon T = (eV - \epsilon V) \cdot \alpha T / (\alpha L + \alpha T) \quad (4)$$

wherein $\epsilon L$ is a shrinkage factor in a flow direction in the planar directions, $\epsilon T$ is a shrinkage factor in a direction perpendicular to the flow direction in the planar directions, $\alpha L$ is a thermal expansion coefficient in the flow direction, and $\alpha T$ is a thermal expansion coefficient in a direction perpendicular to the flow direction. Thus, a warp prediction of the molded article made of the fiber filled resin can be performed at higher precision.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a comparison table showing a comparison in shrinkage factors at positions H1 to H4 of the plate-like test piece shown in FIGS. 2(a) and 2(b), in which the upper position of each column shows an actually measured value, the middle position thereof shows a predicted analytic value of anisotropic shrinkage, and the lower position thereof shows a predicted analytic value of isotropic shrinkage;

It must be noted that the present invention is not limited to the preferred embodiment to be described below and accompanying drawings thereof, and various arrangements can be made without departing from the spirit and scope defined by the appended claims.

DETAILED DESCRIPTION OF THE PREFERRED EMBODIMENT

The preferred embodiment of the present invention will be described with reference to the accompanying drawings.

Figure 1:
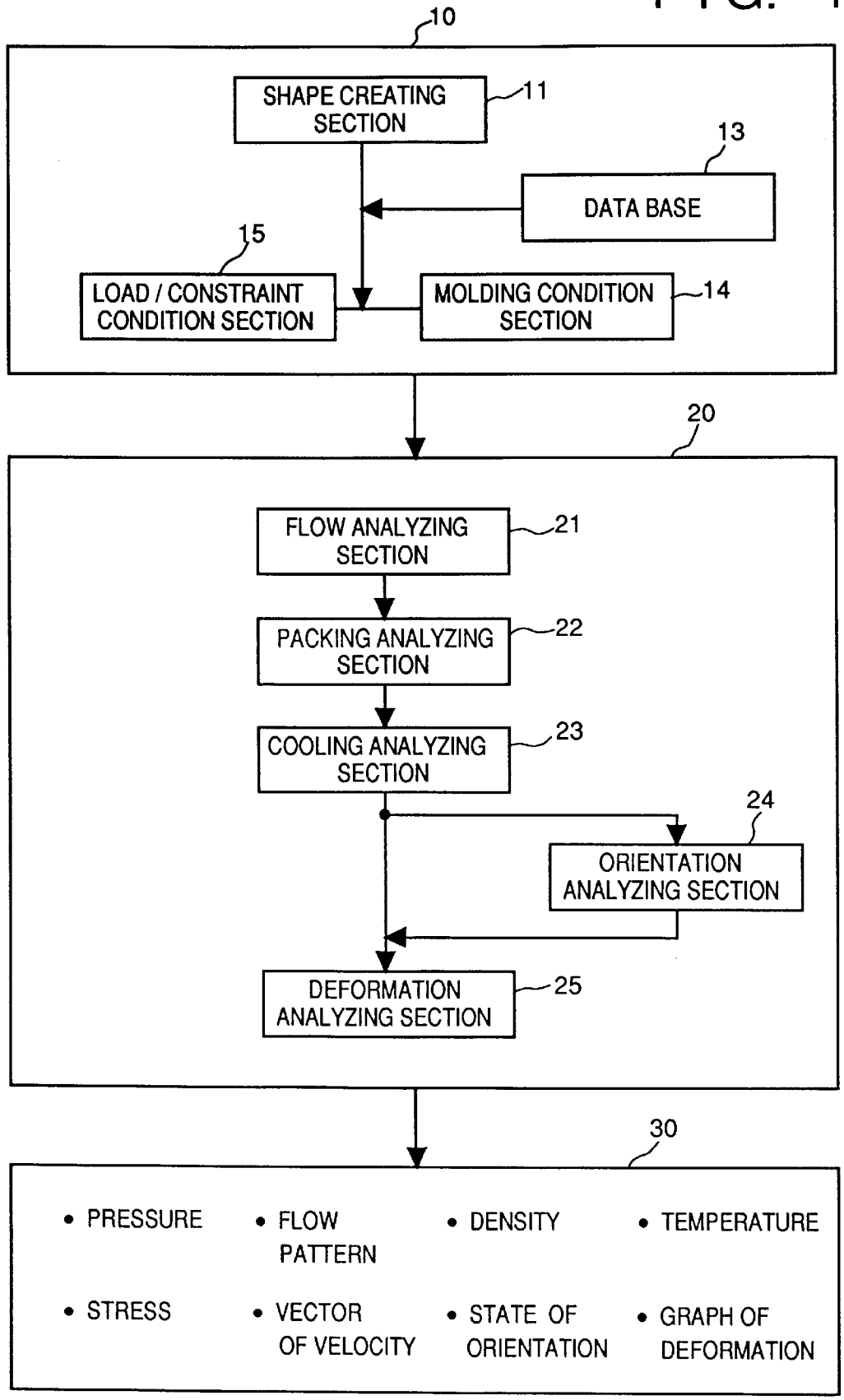
FIG. 1 is a schematic diagram of a method of predicting a deformation amount in an injection-molded article according to an embodiment of the present invention, and an apparatus for the same.

FIG. 1 is a schematic diagram of a simulation system for predicting a deformation amount in an injection-molded article. Referring to FIG. 1, in an input unit 10, a model shape as the target of analysis is created by a shape creating section 11, and is divided into meshes to enable analysis. Resin data to be actually used is selected from a database 13. Desired data are input and set in a processing unit 20 from a molding condition section 14 and a load/constraint condition section 15. Calculation concerning the behavior of the resin is executed by the processing unit 20.

In the processing operation by the processing unit 20, as shown in FIG. 1, the behavior of the resin in the mold is calculated by a flow analyzing section 21. The behavior of the resin in the packing process considering the compression properties of the resin is analyzed by a dwell analyzing section 22 based on the calculation result of the flow analyzing section 21. Then, the behavior of the resin in the following cooling step is calculated by a cooling analyzing section 23.

In prediction of the behavior of the resin in the packing and cooling processes, the shrinkage factor of a molded article is calculated based on an equation of P (Pressure)–V (Volume ratio)–T (Temperature), and the shrinkage factors in the direction of thickness and the planar directions are calculated from an equation of anisotropic shrinkage. When a resin reinforced by glass fiber filling is used, orientation analysis for predicting the orientation of the fibers in the resin of the molded article is performed by an orientation analyzing section 24.

Finally, based on the above predicted behavior of the resin in the mold, deformation analysis for obtaining the warp deformation in the molded article after being removed from the mold is performed by a deformation analyzing section 25 based on equations (1) and (2), or (3) and (4), thus predicting the warp deformation. Obtained analytic deformation is output to an output unit 30 and displayed on, e.g., a monitor, together with various factors.

Figure 2A:
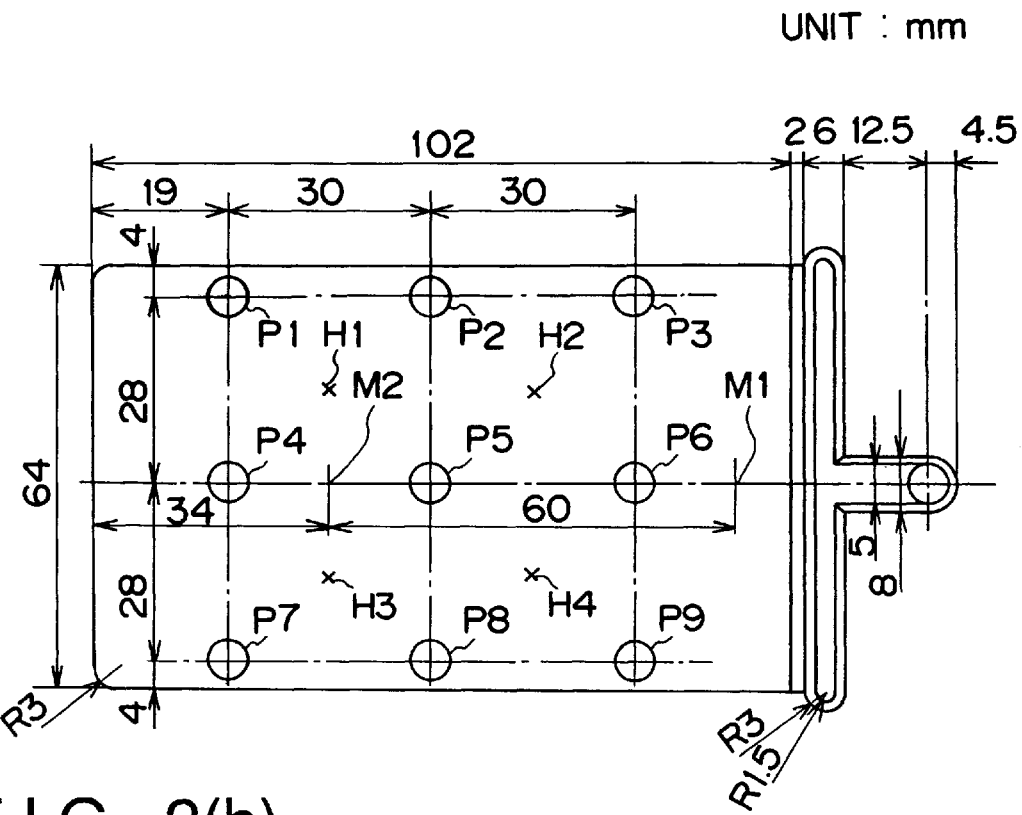
FIG. 2(a) is a plan view of a plate-like test piece.
Figure 2B:
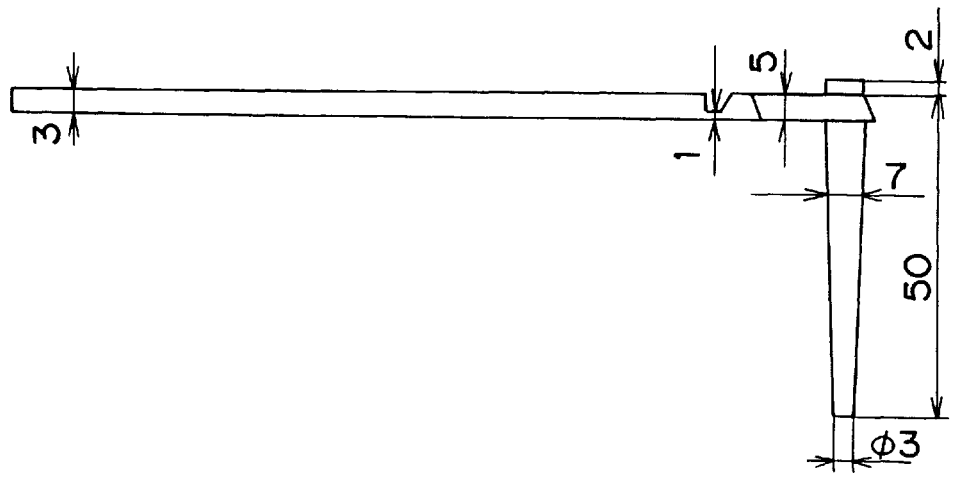
FIG. 2(b) is a front view of the plate-like test piece.

A prediction result obtained according to the above calculation flow will be indicated as comparison between the shrinkage factors obtained by measuring an actual molded article by using a plate-like test piece shown in FIGS. 2(a) and 2(b), and the shrinkage factors as the result of analysis.

FIG. 2(a) is a plan view of the plate-like test piece, and FIG. 2(b) is a front view of the same. Referring to FIGS. 2(a) and 2(b), the model shape is created so as to facilitate analysis of the plate-like test piece, and is divided into meshes. As the molding conditions, conditions similar to those with which actual molding is performed are set, and material data of the resin is input. In this case, a material containing PC (polycarbonate) fibers is used. The material data includes the shrinkage coefficients considering the anisotropy of the shrinkage factor.

After the above conditions are set, calculation is performed from the flowing process to the packing process and then to the cooling process. In this cooling process, calculation considering anisotropic shrinkage is performed, and coordinate measurement positions P1 to P9, thickness measurement positions H1 to H4, and pressure measurement positions M1 and M2 are set, as shown in FIG. 2(a), as the respective positions of the molded article.

FIG. 3 is a comparison table showing comparison in shrinkage factor at positions H1 to H4 of FIG. 2(a), in which the upper position of each column shows an actually measured value, the middle position thereof shows a predicted analytic value of anisotropic shrinkage, and the lower position thereof shows a predicted analytic value of isotropic shrinkage. It is known from this comparison table that precision of the shrinkage factors (in the flow direction and the orthogonal direction) in the planar directions obtained by calculation by the deformation analyzing section 25, which are the shrinkage factors obtained by considering anisotropic shrinkage, is further increased.

A case will be described wherein calculation of the flowing, packing, and cooling processes is performed by considering anisotropic shrinkage, and calculation for predicting a warp deformation of a fixing/paper discharge guide, which is a molded article used in various types of office machines to guide paper, is performed.

Figure 4:
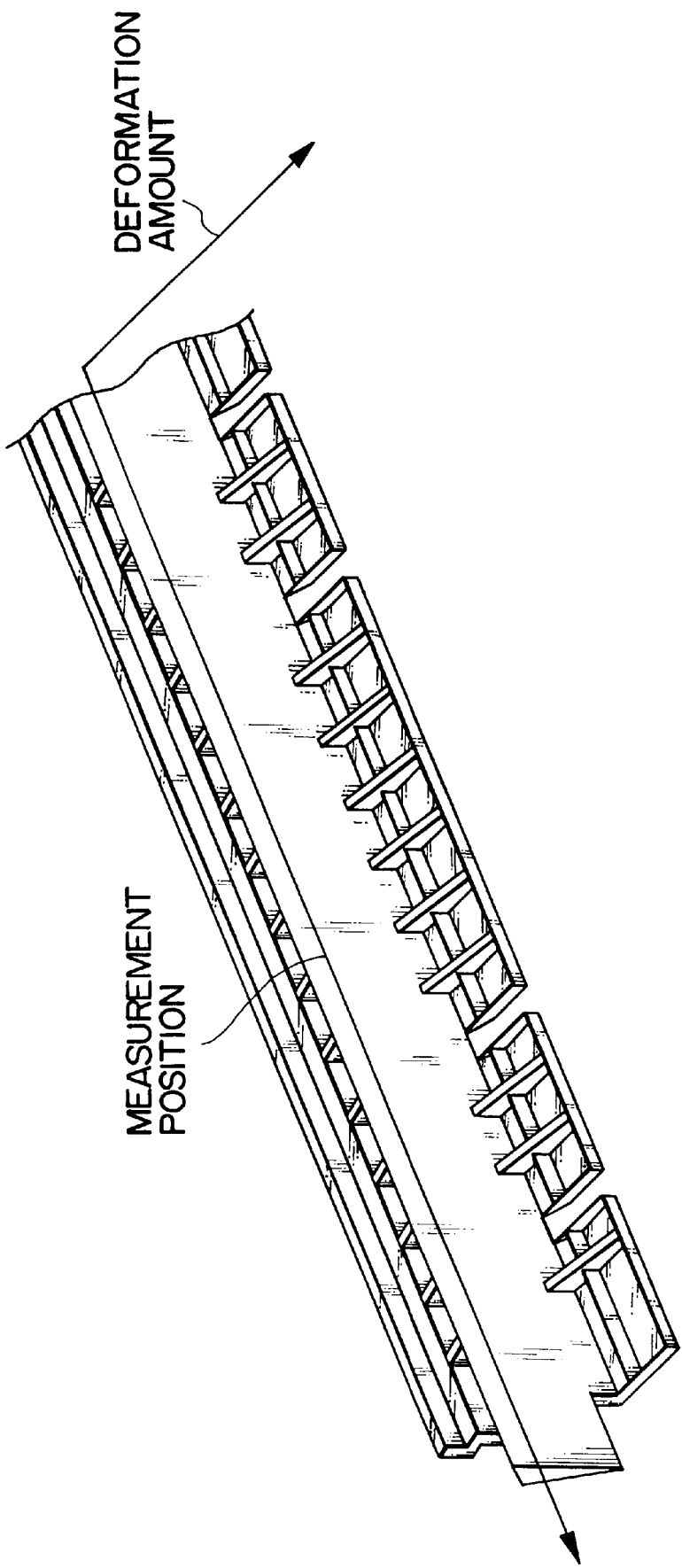
FIG. 4 is a perspective view showing the outer appearance of a fixing/paper discharge guide.

FIG. 4 is a perspective view showing the outer appearance of the fixing/paper discharge guide. As shown in FIG. 4, a large number of ribs are provided at measurement positions in the direction indicated by an arrow. A deformation amount in a direction perpendicular to the measurement positions of this fixing/paper discharge guide will be calculated as a "warp". In order to predict the warp deformation of this fixing/paper discharge guide, the model shape is created, mesh division is performed, the molding conditions and resin data are input, and the constraint condition is set in accordance with the flow of the analytic calculation described above. The flowing, packing, and cooling analyses are performed. The orientation of the fiber contained in the resin is calculated. Then, warp deformation analysis is performed by the deformation analyzing section 25.

Figure 5:
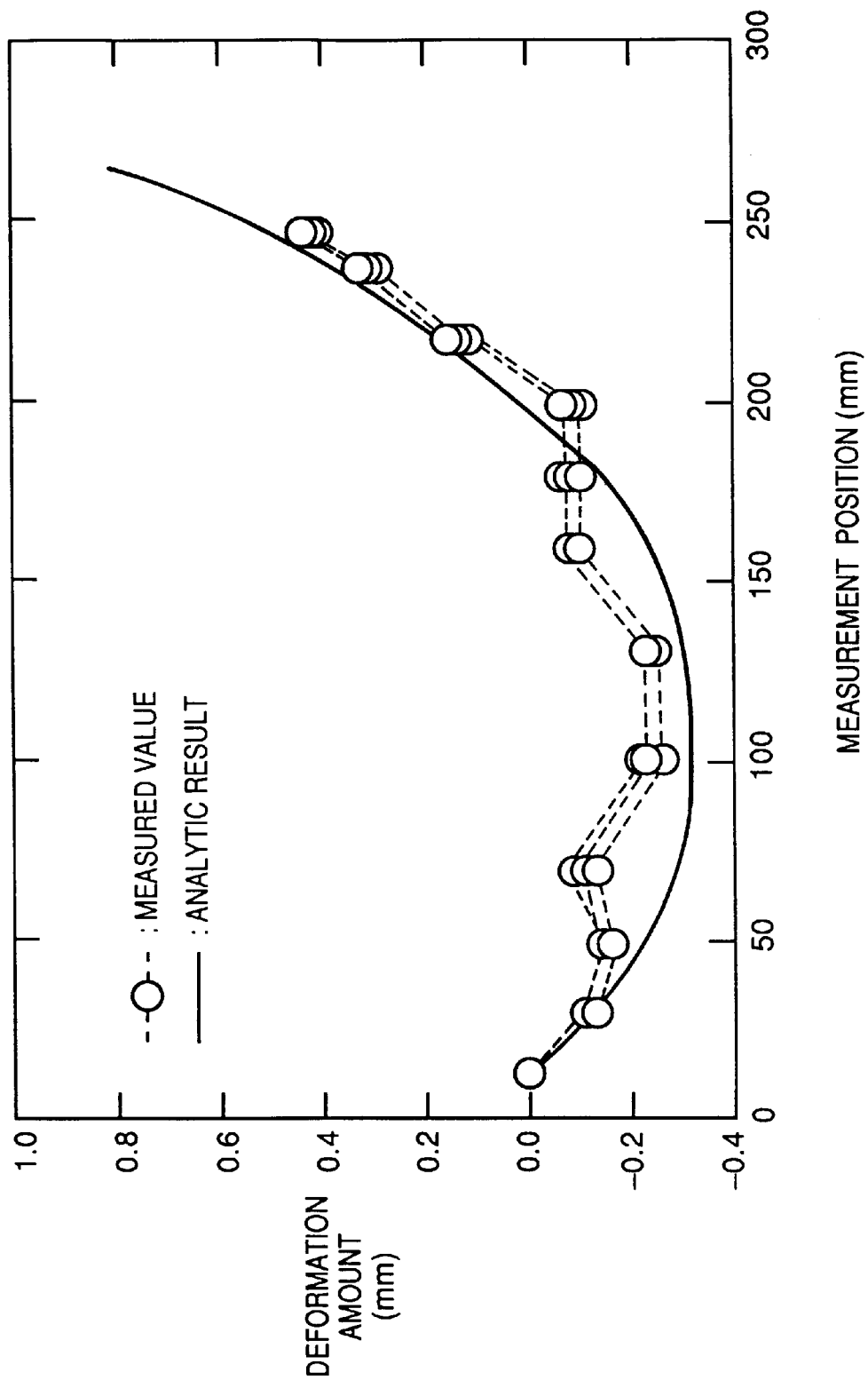
FIG. 5 is a graph showing comparison between the actually measured values and the analytic result of deformation amounts perpendicular to the measurement positions of the fixing/paper discharge guide.

FIG. 5 is a graph showing comparison between actually measured values and analytic result of the amounts of deformation of the fixing/paper discharge guide in a direction perpendicular to the measurement positions. It is confirmed from FIG. 5 that the analytic result indicated by a solid line, and a measurement result obtained by connecting, with broken lines, measurement results measured at the respective measurement positions of the fixing/paper discharge guide and indicated by circles, are very similar.

Therefore, even if the injection-molded article has a complicated shape, a warp deformation can be predicted with a very high precision.

As described above, the precision of prediction of the shrinkage factor is improved, and the precision of prediction of the warp deformation is also improved, thereby improving the reliability of the simulation program. An improvement in precision of prediction of the warp deformation helps in pre-study of product development, and supports prediction of a trouble and a quick countermeasure for the trouble, thus providing significant industrial advantages.

As has been described above, according to the method of predicting the deformation amount in an injection-molded article and an apparatus for the same of the present invention, a warp deformation in an injection-molded article can be predicted at higher precision. Thus, e.g., the anisotropic behavior of a plastic resin in a thin molded article can be predicted as a warp at higher precision.

The present invention can be applied to a system constituted by a plurality of equipments and to an apparatus comprising one equipment. The present invention can also be applied to a system or an apparatus which is achieved by being provided with a program, as a matter of course.

Figure 6:
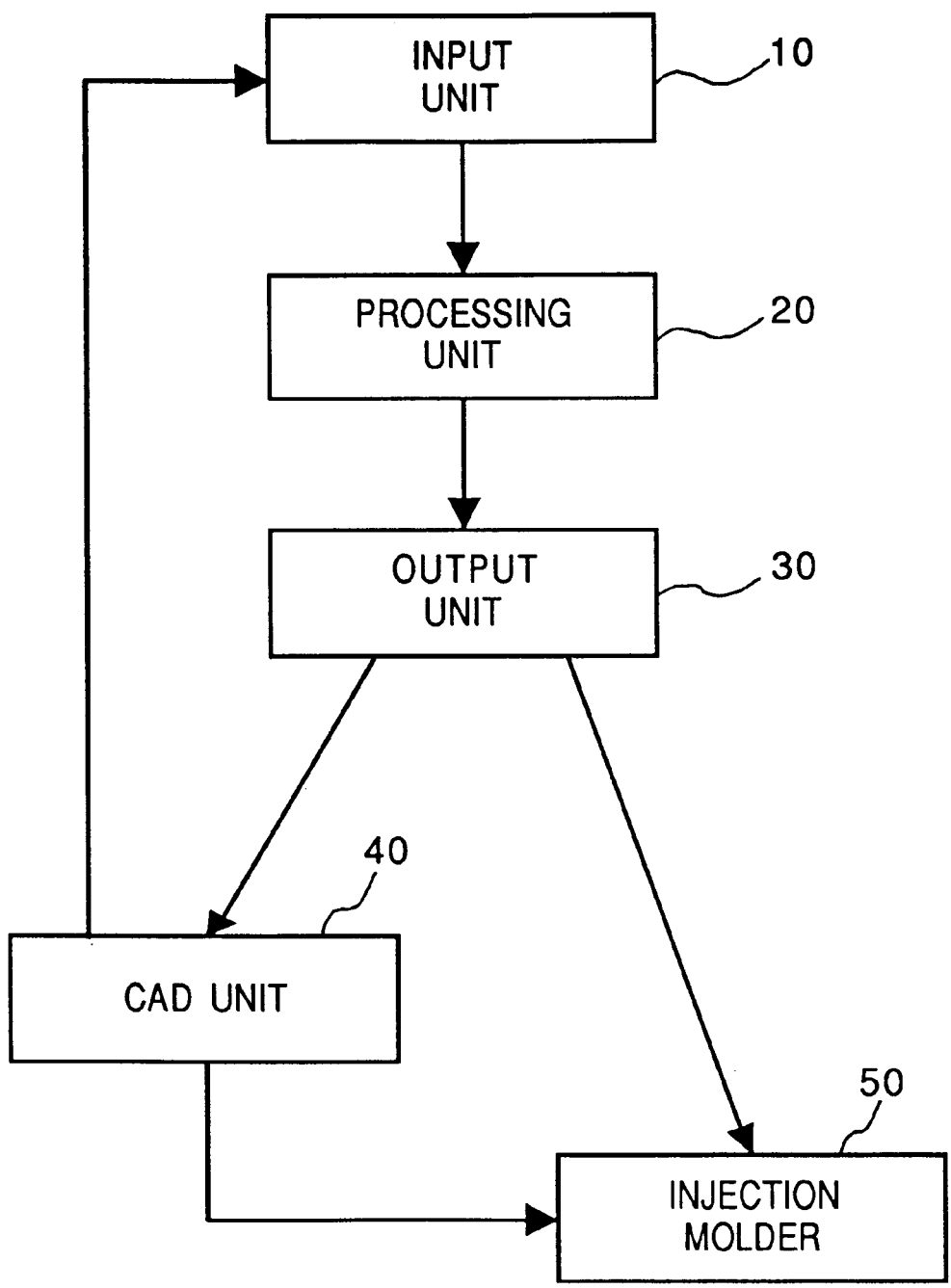
FIG. 6 is a block diagram showing an expansion of this system.

As an expansion of this system, the arrangement shown in FIG. 6 can be realized. Referring to FIG. 6, a result obtained by a processing unit 20 is output from an output unit 30 to a CAD unit 40, so that the present invention can be utilized in quick product design. When the above result is output to an injection molder 50, it can be reflected in the mold design, so that a high-precision product having no warp or the like can be molded.

Data can be supplied to the injection molder 50 directly from the output unit 30 or through the CAD unit 40. Data can also be supplied from the processing unit 20 to the CAD unit 40 and the injection molder 50 not through the output unit 30. If the CAD unit 40 outputs to an input unit 10 again shape data of a member altered in accordance with the processing result, a member having less warp can be easily designed. When the warp is eliminated, this data is input to the injection molder 50 to obtain a molded article. In this manner, a simple system having desired precision and a higher yield can be constructed.

As many apparently widely different embodiments of the present invention can be made without departing from the spirit and scope thereof, it is to be understood that the invention is not limited to the specific embodiments thereof except as defined in the appended claims.

What is claimed is:

1. In a simulation system which predicts a behavior of a molten resin in a mold in filling, packing, and cooling processes by using a fundamental equation formulated by the finite element method, and shrinkage factors in a direction of thickness and planar directions based on anisotropy of a volume shrinkage factor obtained during prediction of the filling, packing, and cooling processes, a method of predicting a deformation amount in an injection-molded article, wherein a warp deformation is predicted by calculating the shrinkage factors in accordance with:

$$_\varepsilon Z = A + B \cdot eV \quad [(1)]$$

$$_\varepsilon P = (eV - {_\varepsilon Z})/2 \quad [(2)]$$

wherein $_\varepsilon Z$ is a shrinkage factor in the direction of thickness, $_\varepsilon P$ is a shrinkage factor in the planar directions, $eV$ is a volume shrinkage factor and A and B are shrinkage coefficients.

2. In a simulation system apparatus which predicts a behavior of a molten resin in a mold in filling, packing, and cooling processes by using a fundamental equation formulated by the finite element method, and shrinkage factors in a direction of thickness and planar directions based on anisotropy of a volume shrinkage factor obtained during prediction of the filling, packing, and cooling processes, an apparatus for predicting a deformation amount in an injection-molded article, comprising deformation analyzing means for predicting a deformation amount by calculating the shrinkage factors in accordance with:

$$_\varepsilon Z = A + B \cdot eV \quad [(3)]$$

$$_\varepsilon P = (eV - {_\varepsilon Z})/2 \quad [(4)]$$

wherein $_\varepsilon Z$ is a shrinkage factor in the direction of thickness, $_\varepsilon P$ is a shrinkage factor in the planar directions, $eV$ is a volume shrinkage factor, and A and B are shrinkage coefficients.

3. In a simulation system which predicts a behavior of a fiber-containing molten resin in a mold in filling, packing, and cooling processes by using a fundamental equation formulated by the finite element method, and shrinkage factors in a direction of thickness and planar directions based on anisotropy of a volume shrinkage factor obtained during prediction of the filling, packing, and cooling processes, a method of predicting a deformation amount in an injection-molded article wherein a warp deformation is predicted by calculating the shrinkage factors in accordance with:

$$\varepsilon Z = A + B \cdot eV$$

$$\varepsilon P = (eV - \varepsilon Z)/2$$

$$\varepsilon L = (eV - \varepsilon Z) \cdot \alpha L / (\alpha L + \alpha T)$$

$$\varepsilon T = (eV - \varepsilon Z) \cdot \alpha T / (\alpha L + \alpha T)$$

wherein $_\varepsilon Z$ is a shrinkage factor in the direction of thickness, $_\varepsilon P$ is a shrinkage factor in the planar directions, $eV$ is a volume shrinkage factor, and A and B are shrinkage coefficients, $_\varepsilon L$ is a shrinkage factor in a flow direction in the planar directions, $_\varepsilon T$ is a shrinkage factor in a direction perpendicular to the flow direction in the planar directions, $_\alpha L$ is a thermal expansion coefficient in the flow direction, and $_\alpha T$ is a thermal expansion coefficient in a direction perpendicular to the flow direction.

4. In a simulation system which predicts a behavior of a fiber-containing molten resin in a mold in filling, packing, and cooling processes by using a fundamental equation formulated by the finite element method and shrinkage factors in a direction of thickness and planar directions based on anisotropy of a volume shrinkage factor obtained during prediction of the filling, packing, and cooling processes, an apparatus for predicting a deformation amount in an injection-molded article wherein a warp deformation is predicted by calculating the shrinkage factors in accordance with:

$$\varepsilon Z = A + B \cdot eV$$

$$\varepsilon P = (eV - \varepsilon Z)/2$$

$$\varepsilon L = (eV - \varepsilon Z) \cdot \alpha L / (\alpha L + \alpha T)$$

$$\varepsilon T = (eV - \varepsilon Z) \cdot \alpha T / (\alpha L + \alpha T)$$

wherein $_\varepsilon Z$ is a shrinkage factor in the direction of thickness, $_\varepsilon P$ is a shrinkage factor in the planar directions, $eV$ is a volume shrinkage factor, and A and B are shrinkage coefficients, $_\varepsilon L$ is a shrinkage factor in a flow direction in the planar directions, $_\varepsilon T$ is a shrinkage factor in a direction perpendicular to the flow direction in the planar directions, $_\alpha L$ is a thermal expansion coefficient in the flow direction, and $_\alpha T$ is a thermal expansion coefficient in a direction perpendicular to the flow direction.

* * * * *